(12) United States Patent
Denzer et al.

(10) Patent No.: US 11,017,052 B1
(45) Date of Patent: *May 25, 2021

(54) ELECTRONIC FORMS INTERACTION FRAMEWORK FOR A CONSISTENT USER EXPERIENCE

(71) Applicant: STATE FARM MUTUAL AUTOMOBILE INSURANCE COMPANY, Bloomington, IL (US)

(72) Inventors: Frederick L. Denzer, Bloomington, IL (US); Tyrone David Hartness, Jr., Bloomington, IL (US); Michael Patrick Henry, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,821

(22) Filed: Oct. 11, 2019

Related U.S. Application Data

(63) Continuation of application No. 14/475,811, filed on Sep. 3, 2014, now Pat. No. 10,482,150.

(51) Int. Cl.
*G06F 16/957* (2019.01)
*G06F 16/958* (2019.01)
(Continued)

(52) U.S. Cl.
CPC ...... *G06F 16/9577* (2019.01); *G06F 3/04842* (2013.01); *G06F 16/986* (2019.01); *G06F 40/106* (2020.01)

(58) Field of Classification Search
CPC .. G06F 26/9577; G06F 26/986; G06F 40/106; G06F 3/04842; G06F 16/9577; G06F 16/986
See application file for complete search history.

(56) References Cited

U.S. PATENT DOCUMENTS 7,451,392 B1   11/2008   Chalecki et al.
7,966,561 B1   6/2011   Nguyen et al.
(Continued)

FOREIGN PATENT DOCUMENTS

EP   2 632 130 A1   8/2013

*Primary Examiner* — Stephen S Hong
*Assistant Examiner* — Nicholas Hasty
(74) *Attorney, Agent, or Firm* — Marshall, Gerstein & Borun LLP

(57) ABSTRACT

A computer-implemented method may facilitate user interaction with an interactive form. In one aspect, the method may detect a selection of the form by a user of a client device. The method may then automatically provide instructions that cause a web browser application of the client device to (1) display a submit control inside a form interaction framework area of a form interaction page, the form interaction framework area being outside a form container area of the form interaction page, (2) use a viewer software component to display the interactive form inside the form container area while the submit control is displayed in the form interaction framework area, and (3) in response to detecting a user activation of the submit control, communicate the user activation to the interactive form using a programmatic interface of the viewer software component such that the interactive form executes the form submission function.

20 Claims, 6 Drawing Sheets

(51) Int. Cl.
*G06F 3/0484* (2013.01)
*G06F 40/106* (2020.01)

(56) References Cited

U.S. PATENT DOCUMENTS

| | | |
|---|---|---|
| 8,355,966 B1 | 1/2013 | Vu et al. |
| 8,555,165 B2 | 10/2013 | Hunleth et al. |
| 9,262,393 B2 * | 2/2016 | Naderi .................. G06F 40/174 |
| 2003/0070004 A1 | 4/2003 | Mukundan et al. |
| 2006/0179404 A1 * | 8/2006 | Yolleck ................ G06F 40/174 |
| | | 715/272 |
| 2006/0212515 A1 | 9/2006 | Shienbrood et al. |
| 2007/0198910 A1 | 8/2007 | Jensen et al. |
| 2009/0182717 A1 | 7/2009 | Zilberfayn et al. |
| 2010/0313111 A1 | 12/2010 | Ozonat et al. |
| 2011/0161941 A1 | 6/2011 | Thomson et al. |
| 2013/0097519 A1 | 4/2013 | Andersson et al. |
| 2013/0205189 A1 * | 8/2013 | DiPierro ............... G06F 3/0483 |
| | | 715/224 |
| 2013/0318446 A1 | 11/2013 | Ghotgalkar et al. |
| 2014/0095971 A1 | 4/2014 | Gowen et al. |

\* cited by examiner

FIG. 2

XYZ Company → Business Unit 1   Business Unit 2   Business Unit 3   My Account

New Account Form

This form provides us with the information needed to open a new account on your behalf.

[Find] [Sign] [Review] [Save] [Help]

[Submit] [Clear | Cancel]

*Form cannot be submitted until all required fields are filled with valid information*

Last Name: [Doe]
First Name: [John]
Street Address: [Circle Lane]   *Street address must include numeric characters*
City: [        ]   *Must enter city*
State: [IL]
Married [✓]   Single [ ]

Contact Info | About Us | Careers | Site Map | Terms of Use | Security → *Copyright Information*

ELECTRONIC FORMS INTERACTION FRAMEWORK FOR A CONSISTENT USER EXPERIENCE

CROSS-REFERENCE TO RELATED APPLICATIONS

This is a continuation of U.S. patent application Ser. No. 14/475,811, entitled "Electronic Forms Interaction Framework for a Consistent User Experience" and filed on Sep. 3, 2014, the disclosure of which is hereby incorporated herein by reference in its entirety.

FIELD OF THE DISCLOSURE

The present disclosure generally relates to electronic forms and, more specifically, to systems and methods for providing users with interactive, browser-based electronic forms.

BACKGROUND

Currently, many commercial and non-commercial entities, such as insurance companies, financial services companies, government agencies, etc., provide interactive forms that users (e.g., customers) may conveniently access via the Internet using a web browser. For example, a company or other entity may provide registration forms, application forms, insurance claim forms, change of address forms, refund request forms, complaint forms, etc. Indeed, some companies require hundreds or even thousands of different interactive forms for a wide variety of purposes. A form is generally "interactive" in the sense that a user may enter information into various fields of the form and, for some forms, receive feedback based on those entries (e.g., to indicate an invalid entry). As business needs dictate, different interactive forms may be developed using different types of vendor tooling and/or file formats. For example, some forms may be created in a PDF format using Adobe tooling, other forms may be created in a PDF, HTML, or XML-based format using Hewlett-Packard tooling, other forms may be created in a PDF, HTML, or XML-based format using Thunderhead tooling, etc.

The file format and vendor tooling used to create and view a form may dictate the "look and feel" of the form when accessed by a user via a web browser, as well as the interactive functionality/features that the form provides. Moreover, the idiosyncrasies of the individuals designing the various forms may result in substantial differences in the look, layout and/or functionality/features of different forms. Any or all of these factors may cause a user's experience to vary significantly depending upon which form he or she accesses, which may in turn lead to user confusion. For example, different forms may present buttons for the same action with a different label, a different appearance, and/or a different location. Moreover, identically labeled form action buttons (e.g., "submit," "clear," etc.) might cause different results for different forms depending upon the manner in which each form implements the action. For example, clicking a "submit" button in a first form may cause a pop-up window to appear requesting the user to confirm the submission, while clicking a "submit" button in a second form may cause the form entry information to be posted to a server without requesting user confirmation. A user may also be confused as to the source of forms, or view forms as "unprofessional," if ancillary information included on the forms (e.g., company name/logo, contact information, web links to other company information, etc.) differs from form to form in terms of appearance, location and/or content.

In addition to providing an inconsistent user experience and possible user confusion, the conventional approach to providing forms may be very costly/inefficient when a change must be implemented across a large number of forms. For example, changing a company logo included on hundreds or thousands of different forms generally requires each of those forms to be individually modified. As another example, if certain aspects of a particular type of vendor tooling were to change due to a software update, all of the forms created using that vendor tooling might require individual coding modifications.

SUMMARY

The present embodiments may, inter alia, provide a more consistent user experience, and/or reduce user confusion. The present embodiments may also significantly reduce the amount of time, effort and/or cost associated with making changes to features that are common to multiple forms.

In one aspect, a computer-implemented method for facilitating user interaction at a client device with an interactive form having one or more fillable fields may be implemented in an electronic forms processing system. The method may include (1) detecting, by a processor of the electronic forms processing system, a selection of the interactive form by a user of the client device; and (2) after detecting the selection of the interactive form, automatically providing, by a processor of the electronic forms processing system, form interaction framework software to the client device. The form interaction framework software includes instructions that cause a web browser application of the client device to (1) display, via a user interface of the client device, a submit control inside a form interaction framework area of a form interaction page, the submit control corresponding to a form submission function, and the form interaction framework area being outside of a form container area of the form interaction page; (2) use a viewer software component that extends functionality of the web browser application to display, according to instructions of the interactive form, the interactive form inside the form container area while the submit control is displayed inside the form interaction framework area; and (3) in response to detecting a user activation of the submit control inside the form interaction framework area, communicate the user activation of the submit control to the interactive form using a programmatic interface of the viewer software component such that the interactive form executes the form submission function. The form submission function includes submitting information entered by the user in the one or more fillable fields to a server device remote from the client device. The method may include additional, fewer, or alternate actions, including those discussed elsewhere herein.

In another aspect, a non-transitory computer-readable medium stores form interaction framework software including instructions for facilitating user interaction at a client device with an interactive form having one or more fillable fields. The instructions cause a web browser application of the client device to: (1) display, via a user interface of the client device, a submit control inside a form interaction framework area of a form interaction page, the submit control corresponding to a form submission function, and the form interaction framework area being outside of a form container area of the form interaction page; (2) use a viewer software component that extends functionality of the web browser application to display, according to instructions of the interactive form, the interactive form inside the form container area while the submit control is displayed inside the form interaction framework area; and (3) in response to detecting a user activation of the submit control inside the form interaction framework area, communicate the user activation of the submit control to the interactive form using a programmatic interface of the viewer software component such that the interactive form executes the form submission function. The form submission function includes submitting information entered, by a user of the client device, in the one or more fillable fields to a server device remote from the client device. Additional, less, or alternate functionality may be provided, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

FIG. 2 depicts an exemplary display at a client device in response to a user selecting a first interactive form, according to one embodiment and scenario.

DETAILED DESCRIPTION

Figure 1:
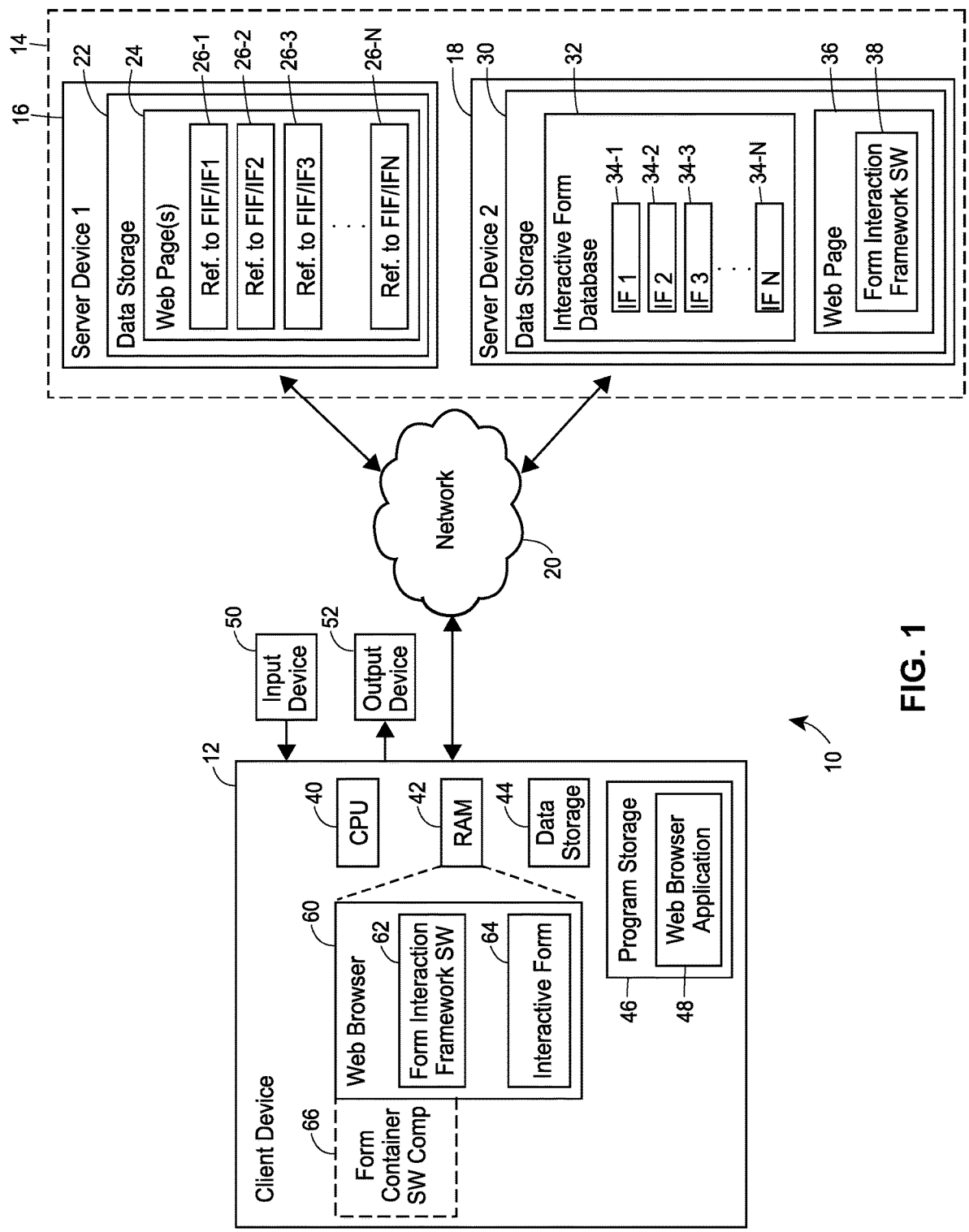
FIG. 1 depicts an exemplary environment including components and entities associated with providing a plurality of interactive forms while maintaining a consistent user experience, according to an embodiment.

The present embodiments may provide, inter alia, a Form Interaction Framework. The Form Interaction Framework may facilitate modifying several different forms in a uniform manner. The Form Interaction Framework may allow users to interact with electronic forms in a consistent manner, and contain several zones which each perform a specific function in the overall user experience.

The Form Interaction Framework may abstract common elements that are usually coded within a form to an external layer that may be reused by all forms. By abstracting these elements from the form itself, form design time may be reduced. Exemplary common elements and/or zones that may be used for all forms and which support the consistent user experience may include Header, Form Description, Action, Message, and/or Footer zones.

The Form Interaction Framework may be an application that displays each of the zones on a user interface. Each zone may have a dedicated box or area of the user interface. Also displayed on the user interface may be a Form Container showing a portion of, or even all, of the form being modified by the Form Interaction Framework. In one embodiment, the Form Container itself may not be a part of the Form Interaction Framework.

The content for the Header and Footer zones, for example, may be coded separately from the form and be dynamically resolved when the form is displayed to the user. A Form Description zone may display form metadata (e.g., title, purpose and use, etc.) which may not be part of the form itself. Just prior to display, the values may be read from a database and populated in the Form Description zone.

The Action zone may be where a user takes actions against the form. Actions may be visually displayed in the form of a button, icon, or any other user interface construct (i.e., different devices may render the actions in different ways). The appropriate actions may be resolved just prior to the display of the form. The Message zone may be used to display informational and exception messages. If no message is pertinent, the Message area may be blank and collapse to show more of a form to be modified.

The present embodiments may also provide a Communication Bridge. The Communication Bridge may link the Form Interaction Framework and the Form Container. As a user takes action in the Action zone, the Communication Bridge (which may include customized computer instructions) may communicate the action to the form inside of the Form Container, which may then act upon the form (e.g., Save as Draft, Submit, etc.). Prior to this concept, these actions would be coded into the form itself—for each and every form.

The Communication Bridge may provide flexibility and reduce time to market and/or implementation time. For example, an entity may have many company-related pdf forms in which the Print button is coded within each pdf form. The pdf forms may be impacted by a change to reader applications (e.g., Adobe Reader) or browser, and no longer function as intended. In the past, many hours would have to be expended to manually edit each affected form to correct the code behind the Print button to function properly with the updated reader product. The Form Interaction Framework, on the other hand, may allow for the Print button coding to be updated for several forms at one time and in one place, thereby reducing the amount and duration of the work to correct this situation.

The Form Interaction Framework may also be used to update a volume of company forms in a consistent manner. For instance, a company may want to change several or all of its forms at once, including changing the company logo on each form, adding another logo, changing or updating boilerplate information (such as "Business Confidential—For Internal Use Only"), making coloring or "look and feel" changes, and/or other changes. Coding each form separately may lead to inconsistencies and/or errors, while the Form Interaction Framework may ensure consistencies across all forms that are modified.

In one embodiment, the Form Interaction Framework may facilitate modification of various forms. The Form Interaction Framework may include several zones, including an Action zone. As shown with respect to FIG. 2 (discussed below), a form may include several fields to be filled in by a user, such as last name, first name, street address, city, state, and other information. A user may use the Form Interaction Framework to fill out, or makes change to, the form during runtime (such as by entering their name and address). After making changes to the form within a Form Container, the user may save or accept the changes to the form, such by clicking upon a save or submit icon in the Action zone.

Further, as shown by FIG. 2 for example, the Form Interaction Framework may include several Action zone buttons or icons that perform actions on the forms within the Form Container, such as print, save, cancel, draft, help, find, sign, review, help, submit, clear, cancel, and/or other buttons or icons that provide for additional functionality. A change to the functionality performed by one of the Action zone buttons or icons, or adding a new Action zone button or icon, may be accomplished by modifying the Form Interaction Framework. As a result, the modification to the Form Interaction Framework may result in changing the functionality of several different forms, or the manner in which the different forms are updated or filled out by various users.

I. Exemplary Provision of Interactive Forms

The present embodiments may relate to presenting users with a variety of interactive forms via web browser applications running on the users' client devices (e.g., mobile devices, notebook computers, laptop computers, desktop computers, tablets, phablets, smartphones, smart watches, smart glasses, wearable electronic devices, smart contact lenses, personal digital assistants (PDAs), handheld or portable computing devices, computing devices capable of wired or wireless communication, etc.). The interactive forms may be forms for opening new accounts, forms for changing account and/or personal information, forms for submitting claim information, forms for providing customer feedback, and/or any other types of forms that may be utilized by a business or non-business (e.g., government) entity. Each form has one or more fillable fields and conforms to a particular file format, such as a Portable Document Format (PDF), HyperText Markup Language (HTML), or Extensible Markup Language based (XML-based) file format, for example. Moreover, each form may have been generated using a particular type of vendor tooling, such as Adobe software (e.g., Adobe Acrobat), HP software (e.g., HP Exstream), Thunderhead software (e.g., Thunderhead Doc Editor), or other third party vendor tooling, for example. The vendor tooling used to create a particular interactive form may also dictate the "form container" software that is used to display the form. For example, Adobe Reader software may be used to view a PDF form that was created using Adobe software, HP Exstream software may be used to view a PDF, HTML or XML-based form that was created using HP software, and Thunderhead Doc Editor software may be used to view a PDF, HTML or XML-based form that was created using Thunderhead software. Generally, the form container software may, at least for some forms, include compiled instructions that execute on a processor of the user's client device. For example, the form container software for a particular type of interactive form may be a plugin that extends the functionality of a web browser application running on the user's client device.

When a particular interactive form is selected by a user, the form may be displayed in a form container area of a web page displayed on the user's client device. As noted above, the form container software may depend upon the type of form that is being displayed. To provide a common, consistent user experience with the various interactive forms, however, certain form elements may be provided in a "form interaction framework" area outside of and distinct from the form container area. The form interaction framework area may have one or more zones each presenting different types of content. For example, an "action zone" of the form interaction framework area may include one or more form-level action controls, such as a submit button (e.g., for submitting field entry information to a server), a clear button (e.g., for resetting field entries on the form), a sign button (e.g., for adding an electronic signature to the form), a save button (e.g., for saving field entries), a print button (e.g., for printing the form with the current field entries), a help button (e.g., for displaying information that facilitates the entry of information into one or more fields), and/or any other suitable type of button or other user-selectable control. As other examples, a "header zone" may display header information common to multiple forms (e.g., the name of a company supplying the form, the company logo, links to various business units of the company, etc.), a "footer zone" may display footer information common to multiple forms (e.g., copyright information, links to contact information, "terms of use" or other contractual information, a site map, etc.), a "description zone" may display information describing the particular form being displayed (e.g., a title/label of the form, information about the purpose and/or intended use of the form, etc.), a "message zone" may display informational and/or exception messages relating to the form (e.g., whether a form-level action has been successfully executed, etc.), etc.

The presentation and content of the various zones of the form interaction framework area may be defined by scripting language instructions that are interpretable at runtime by a web browser application of the client device, such as JavaScript or JavaServer Pages (JSP) instructions, for example. A server maintained by the entity providing the interactive forms may make the scripting language instructions available on a web page, for example, and a web browser application running on the user's client device may interpret the scripting language instructions when the user accesses the web page. In addition to defining presentation and content of the zones of the form interaction framework area, the scripting language instructions may include a "communication bridge" that provides one-way or two-way communication with the interactive form being displayed in the form container area. For example, the scripting language instructions may detect when a user activates an action button (e.g., submit, clear, review, etc.) located in the form interaction framework area, and communicate the user activation to the interactive form using the communication bridge. The communication bridge may then receive information from the interactive form (e.g., after the interactive form has performed processing to carry out, or attempt to carry out, the function corresponding to the action button). The scripting language instructions may then generate a message based on the received information, and display the message to the user in the message zone of the form interaction framework area.

As a more specific example, the scripting language instructions may detect when a user clicks a "submit" button in an action zone of the form interaction framework area, and the communication bridge portion of the scripting language instructions may communicate the user activation of the submit button to the interactive form. The interactive form may then perform certain pre-submission processing/tasks in response to the communicated user activation, and either: (1) determine that the form cannot be submitted (e.g., if one or more field entries are invalid), or (2) determine that the form can be submitted and proceed to post the form entries to a remote server. Thereafter, the interactive form may provide the communication bridge with information indicating a result of the processing by the interactive form (e.g., information indicating that the form has been submitted, information indicating that the form has not been submitted because invalid field information has been entered, etc.), and the scripting language instructions may cause a message reflecting the information from the interactive form to be generated and displayed in the message zone of the form interaction framework area.

By omitting common elements from the individual interactive forms displayed in the form container, and instead providing those common elements using form interaction framework software (e.g., JSP or other scripting language instructions) that is reused across different forms, consistency of the user experience may be increased despite differences in file formats and/or vendor tooling. Further, modifications to these common elements may be greatly simplified by allowing outdated elements to be changed in one piece of code (or in relatively few pieces of code), rather than requiring that each and every form be independently modified.

II. Exemplary Environment for Providing Interactive Forms

FIG. 1 depicts an exemplary environment 10 associated with providing a plurality of interactive forms while maintaining a consistent user experience, according to an embodiment. As illustrated in FIG. 1, the environment 10 may include a client device 12 and an entity 14. The entity 14 may be a business entity (e.g., an insurance company, financial services company, etc.), a government entity (e.g., administrative agency), or any other sort of entity that has a need to provide forms to a user/operator of client device 12. For example, the user of client device 12 may be a customer or prospective customer of entity 14. In the example environment 10, entity 14 may be associated with (e.g., owns, leases, maintains, etc.) a first server device 16 and a second server device 18, both of which are communicatively coupled to client device 12 (and, in some embodiments, to each other) via a network 20. Network 20 may be a single communication network, or may include multiple communication networks of one or more types (e.g., one or more wired and/or wireless local area networks (LANs), and/or one or more wired and/or wireless wide area networks (WANs) such as the Internet).

Server device 16 includes a data storage 22, which may include one or more types of persistent memory. Data storage 22 stores one or more web pages 24, which may include HyperText Markup Language (HTML) instructions, JavaScript instructions, JavaServer Pages (JSP) instrutions, and/or any other type of instructions suitable for defining the content and presentation of the web page(s) 24. The web page(s) 24 may include a "home page" of entity 14 that may act as an initial entry point for users/customers, for example, as well as one or more additional pages that may be navigated to find various kinds of information relating to services, products or information offered by entity 14. Distributed among one or more of web page(s) 24 are references to various interactive forms, which are depicted in FIG. 1 as references 26-1 through 26-N (collectively, "references 26"), with N being the number of accessible forms (e.g., tens, hundreds, thousands, etc.). Each of references 26 may be a web page link to a particular interactive form, such as a form for opening a new account, a form for changing account and/or personal information, a form for submitting claim information, a form for providing customer feedback, and/or any other type of form utilized by entity 14. In alternative embodiments, at least one of the web page(s) 24 containing at least one of the references 26 may instead be stored on a server other than server device 16.

In the exemplary environment 10, each of the references 26, when activated by users visiting web page(s) 24, may cause the respective interactive form to be retrieved from server device 18. Server device 18, which may be a part of an electronic forms processing system of entity 14, may include a data storage 30 with one or more types of persistent memory. Stored within data storage 30 may be an interactive form database 32 including interactive forms 34-1 through 34-N (collectively, "interactive forms 34"), which correspond to the N forms referenced by references 26-1 through 26-N. For example, a user selection of the reference 26-1 may cause interactive form 34-1 to be retrieved, a user selection of the reference 26-2 may cause interactive form 34-2 to be retrieved, etc. Each of the interactive forms 34 may be an electronic file that includes instructions defining the content and presentation of the form, and supports/defines interactive features provided by the form. For example, each of interactive forms 34 may include instructions that define a plurality of fields to be entered by a user, the text associated with each of the fields, the location of the fields and text/descriptors associated with the fields, rules for valid entries within one or more of the fields, messages to be displayed next to the fields in response to detecting invalid entries, etc. One or more of interactive forms 34 may also include instructions that define various actions that facilitate the entry of information into the form by a user. For example, some of interactive forms 34 may include instructions for performing a directory lookup to retrieve user-specific information, instructions for calculating values based upon one or more field entries, etc. Some or all of interactive forms 34 may also include instructions for performing various "form-level" actions, such as submitting the form to a remote server (e.g., posting information entered in the form fields to server device 16, server device 18, or another server not shown in FIG. 1), electronically signing the form, printing the form, reviewing and/or validating form field entry information, providing information to help a user complete the form, etc. In some embodiments, however, one, some or all of the interactive forms 34 do not define user interactive controls (e.g., GUI buttons) for one, some or all of the form-level actions that are supported by the respective interactive form(s). For example, interactive form 34-1 may support functionality for form submission, form printing, and form signing, but lack corresponding "submit," "print," or "sign" buttons or their equivalent. As discussed in greater detail below, the interactive controls (e.g., buttons) for such functions may instead be provided using a form interaction framework distinct from the interactive form itself.

Each of the interactive forms 34 may conform to a particular file format. For example, some of interactive forms 34 may be PDF forms, others of interactive forms 34 may be XML-based forms, and still others of interactive forms 34 may be HTML forms. Each of interactive forms 34 may also be associated with a particular type of vendor tooling, and generally require a particular type of viewing software to view the form. For example, interactive form 34-1 may be a PDF form viewable by Adobe Reader, interactive form 34-2 may be an XML-based form viewable by an HP Exstream viewer, etc. In some embodiments, some of the interactive forms 34 do not require any particular viewer software, and may be displayed directly by a standard web browser application. For example, some of the interactive forms 34 may be HTML forms that a web browser application may display without requiring any particular plugin or other software that extends the capability of the web browser application. In alternative embodiments, at least some of the interactive forms 34 may instead be stored at server device 16, and/or at a different server not shown in FIG. 1.

In addition to the interactive form database 32, data storage 30 may store a web page 36 that includes form interaction framework software 38. The form interaction framework software 38 may include scripting language instructions (e.g., JSP instructions) that define the content and presentation of a "form interaction framework" area displayed via a user's web browser application when accessing the web page 36. As the term indicates, the form interaction framework area may provide a framework for interacting with a selected form, as will be described in greater detail below according to various embodiments.

In an alternative embodiment, server device 16 may include data storage 30, and server device 18 may be omitted. In another alternative embodiment, server device 16 may include web page 36 (e.g., as one of web page(s) 24), but retrieves some or all of interactive forms 34 from interactive form database 32 via a LAN or other network connection not shown in FIG. 1.

While many users and client devices may access web page(s) 24, for clarity FIG. 1 illustrates only the client device 12 of a single user. As illustrated in FIG. 1, client device 12 may include a central processing unit (CPU) 40 to execute computer-readable instructions, a random access memory (RAM) 42 to store data and instructions during operation of programs, a data storage 44 that includes persistent memory to store data used by the programs executed by CPU 40, and/or a program storage 46 that includes persistent memory to store the programs executed by CPU 40, including at least a web browser application 48. By way of example, the data storage 44 and/or the program storage 46 may be implemented on a hard disk drive coupled to CPU 40 via a bus (not shown). In general, the components 40, 42, 44 and 46 may be implemented in any suitable manner. Client device 12 may be a personal computer (e.g., desktop, laptop, notebook), or any other suitable stationary or portable computing device or mobile device, such as a tablet, phablet or smartphone, for example. While client device 12 in the example of FIG. 1 includes both storage and processing components, in other embodiments client device 12 is a so-called "thin" client that depends upon another computing device for certain computing and/or storage functions. For example, in some embodiments, data storage 44 and/or program storage 46 is/are external to client device 12 and is/are connected to client device 12 via a network link.

Further, client device 12 may be coupled to an input device 50 that may allow the user to enter inputs to client device 12 and an output device 52 that may allow the user to view outputs/displays generated by client device 12. The input device 50 may be a pointing device such as a mouse, keyboard, trackball device, digitizing tablet, or microphone, for example. The output device 52 may be a display monitor, for example. In one embodiment, input device 50 and output device 52 may be integrated as parts of a single device (e.g., a touchscreen device). Using the input device 50 and the output device 52, a user may interact with a graphical user interface (GUI) of the client device 12.

When CPU 40 executes the web browser application 48, RAM 42 may temporarily store the instructions and data required for its execution. In FIG. 1, the web browser application 48 being executed is represented in the program space of RAM 42 as web browser application 60. In operation, a user operating client device 12 via the input device 50 may use the web browser application 60 to access the web page(s) 24 via the network 20, and the references 26 provided on web page(s) 24 may then allow the user to select a desired one of the interactive forms 34. The exemplary embodiment of FIG. 1 shows the program space of RAM 42 as the program space may exist after the user has clicked on one of references 26 to access web page 34. At that time, server device 18 may have provided the form interaction framework software 38 to client device 12 such that the instructions of the form interaction framework software 38 may be interpreted by the web browser application 60. In FIG. 1, the form interaction framework software 38 is represented in the program space of RAM 42 as the form interaction framework software 62. The form interaction framework software 62, when interpreted by the web browser application 60 may also cause the selected one of interactive forms 34 to be retrieved from the interactive form database 32. In FIG. 1, the selected form is represented in the program space of RAM 42 as the interactive form 64. For example, interactive form 64 may correspond to the local copy of interactive form 34-1 if the user selected reference 26-1, the local copy of interactive form 34-2 if the user selected reference 26-2, etc.

When executing the form interaction framework software 62, the web browser application 60 may cause output device 52 to display the interactive form 64 (i.e., the fields, text, etc. of interactive form 64) in a form container area, and simultaneously display one or more other areas or "zones" for interacting with the interactive form 64, and/or for providing ancillary links and/or information that may be of interest to a user, outside of the form container area. In some embodiments, a form container software component 66 extends the functionality of the web browser application 48 such that the web browser application 60 may display on output device 52, and enable user interactions with (e.g., allow the user to enter information into), forms of a certain type/format, and/or forms generated using a particular vendor tooling. Form container software component 66 may be a set of compiled instructions, such as a plugin or extension, for example. While the form container software component 66 is shown in FIG. 1 within the program space of RAM 42, a persistent copy of the form container software component 66 may be stored in program storage 46 or another persistent memory. Moreover, while FIG. 1 shows only a single form container software component 66, in some embodiments client device 12 includes two or more different form container software components, each of which allows web browser application 60 to display on output device 52, and enable user interactions with, forms of a different type/format, and/or forms generated using a different vendor tooling. For example, a first form container software component may allow web browser application 60 to display (and enable user interactions with) PDF forms generated using Adobe software, a second form container software component may allow web browser application 60 to display (and enable user interactions with) XML-based forms generated using Thunderhead software, etc.

III. Exemplary Interactive Form Displays

Figure 3:
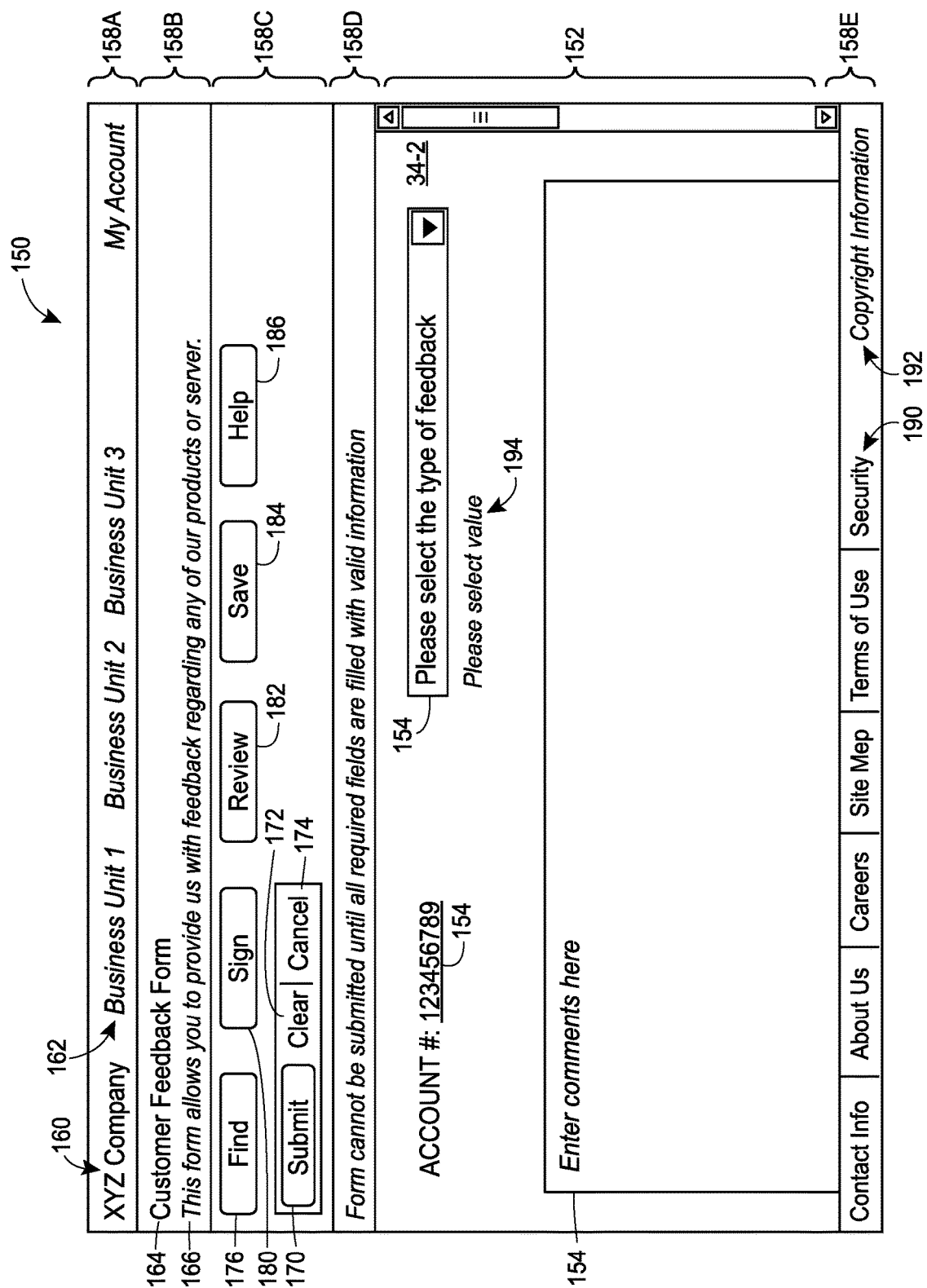
FIG. 3 depicts an exemplary display at a client device in response to a user selecting a different, second interactive form, according to one embodiment and scenario.

Exemplary displays (e.g., web page displays) provided by the web browser application 60 when executing instructions of the form interaction framework software 62 and the interactive form 64 are shown in FIGS. 2 and 3. FIGS. 2 and 3 both correspond to a single embodiment, with FIG. 2 representing a scenario in which the selected interactive form 64 is the interactive form 34-1 (i.e., the display is generated according to form interaction framework software 62 and interactive form 34-1), and FIG. 3 representing a scenario in which the selected interactive form 64 is instead the interactive form 34-2 (i.e., the display is generated according to form interaction framework software 62 and interactive form 34-2). It is noted that the same form interaction framework software 62 may be used to generate both displays. In some embodiments, however, different modules/components of form interaction framework software 62 may be used for different interactive forms depending upon the vendor tooling and/or file format of the particular form being presented (e.g., in order to enable communications with different types of vendor tooling and/or file formats, as discussed further below).

A. Exemplary Display with First Interactive Form

In the exemplary display 100 of FIG. 2, a form container area 102 may display all, or a part of, the interactive form 34-1, including a number of fields 104 in which the user may enter information (e.g., by operating input device 50). In the exemplary embodiment of FIG. 2, a scroll bar allows the user to view different portions of the interactive form 34-1. In other embodiments, and/or in a scenario where the interactive form 34-1 is sufficiently short (or below a certain level of magnification, etc.), the entire interactive form 34-1 may be displayed in the form container area 102 at one time. While FIG. 2 shows that the fields 104 include at least last name, first name, street address, city, state and marriage status, the interactive form 34-1 may of course include more, fewer, and/or different fields in other embodiments, and/or one or more of the fields 104 may have a different appearance and/or be positioned differently within the form container area 102.

Outside of form container area 102, but also within the display 100, a form interaction framework area 108 may include a number of different zones 108A through 108E. Specifically, in the exemplary embodiment of FIG. 2, form interaction framework area 108 may include a header zone 108A, a form description zone 108B, a form action zone 108C, a message zone 108D, and/or a footer zone 108E. In the exemplary embodiment of FIG. 2, the header zone 108A may include information and links associated with entity 14, including a title 110 of entity 14 and various links 112 to other web pages (in this example, links to web pages of various business units of entity 14, and a link to a web page presenting account information of the user). Also in the exemplary embodiment of FIG. 2, the form description zone 108B may present form metadata, including a title 114 of the interactive form 34-1 and a more detailed description 116 of the interactive form 34-1 (e.g., purpose, intended use, etc.).

The action zone 108C may include user-selectable controls for one or more form-level actions. In the embodiment of FIG. 2, for example, the action zone 108C may include a "Submit" button 120 that allows a user to submit information entered in the fields 104 to server device 18 (or a different remote server), a "Clear" button 122 that allows a user to reset one, some or all of fields 104 to default values or states, a "Cancel" button 124 that terminates a submission in progress, a "Find" button 126 that allows the user to search for terms, words, characters, etc. within the interactive form 34-1, a "Sign" button 130 that allows a user to electronically sign the interactive form 34-1, a "Review" button 132 that allows a user to determine whether the information currently entered in one, some or all of the fields 104 constitute valid entries, a "Save" button 134 that allows a user to save information currently entered in one, some or all of the fields 104 (e.g., at a memory coupled to server device 18), and a "Help" button 136 that allows a user to obtain information useful for entering information in one, some or all of the fields 104. In other embodiments, the action zone 108C may include more, fewer and/or different interactive controls than are shown in FIG. 2, different types of controls (e.g., a check box rather than a button, etc.), and/or controls in different orders and/or locations within the zone 108C. For example, the action zone 108C may include a "Print" button for printing the form with field entries, a "Preview" button allowing a user to view the form and field entries prior to printing, etc.

The message zone 108D may provide feedback to the user in response to processing/tasks that have been performed using the interactive form 34-1, as will be described in more detail below according to various embodiments and scenarios. In the exemplary embodiment of FIG. 2, the footer zone 108E includes other ancillary information and/or links 140 associated with entity 14 (e.g., links to web sites or pop-up windows containing contact information, information about entity 14, careers at entity 14, a site map for web page(s) 24 and/or other web pages, terms of use, security information, etc.), and copyright information 142. In other embodiments, footer zone 108E may include less, more and/or different information and/or links than shown in FIG. 2. Moreover, in some embodiments, some information from the header zone 108A may instead (or additionally) be included in the footer zone 108E, and/or vice versa.

In operation, a user may enter information into one, some or all of fields 104 (e.g., using input device 50 of FIG. 1). The interactive form 34-1 may perform some processing in response to individual user entries within the fields 104. In one embodiment, for example, the interactive form 34-1 may determine for one, some or all of fields 104, whether information entered in the field corresponds to a valid entry, and provide a feedback message 144 within the form container area 102 if an entry is not valid. The interactive form 34-1 may provide such feedback immediately upon entry of the information, or after a user has tabbed out of a particular field 104, etc. In the exemplary embodiment and scenario of FIG. 2, the interactive form 34-1 has provided two such feedback messages 144 based on invalid entries (i.e., a message indicating that the "Street Address" field must include numeric characters in response to detecting that "Circle Lane" contains no numbers, and a message indicating that the city must be entered in the "City" field in response to detecting that the field is still blank). In other embodiments, the interactive form 34-1 may instead, or also, perform a database lookup in response to information entered in one or more of fields 104. For example, interactive form 34-1 may automatically populate one or more of the fields 104 in response to information entered by the user in one or more other fields 104 (e.g., automatically populate name and address fields when an account number is entered in a different field, etc.).

In some embodiments, the processing performed by the interactive form 34-1 may be independent of the form interaction framework software 62. For example, form interaction framework software 62 may designate the size and position of the form container area 102, while remaining agnostic with respect to how the interactive form 34-1 is displayed within the form container area 102 and how entry-level actions (e.g., user entry of information into one of fields 104, user activation of a drop-down menu associated with one of fields 104, etc.) are processed by the interactive form 34-1. When a user selects a button in the action zone 108C, however, a "communication bridge" component of the form interaction framework software 62 may communicate the activation of the button to the interactive form 34-1, which has the capability to process the corresponding form-level action. In some embodiments and/or scenarios, the interactive form 34-1 may provide a message back to the form interaction framework software 62 after processing, which may in turn cause a corresponding message to be displayed to the user in the message zone 108D.

Examples are now provided with respect to each of the interactive controls (buttons) in the action zone 108C. It is understood, however, that the actions corresponding to each button in the action zone 108C may correspond to different operations, and/or be implemented in a different manner, in other embodiments.

When a user clicks on the Submit button 120, the communication bridge component of the form interaction framework software 62 may provide the interactive form 34-1 with an indication that the button 120 has been activated. In response to processing the indication, the interactive form 34-1 may cause the information entered in fields 104 to be posted to a remote server (e.g., server device 18). The field entry information may be posted alone, posted along with identifiers of the corresponding field types or labels, or posted along with data reflecting the entire interactive form 34-1 (e.g., as a PDF of the form 34-1 after the user has filled out the fields 104), for example. In some embodiments, the interactive form 34-1 may check whether one, some or all of fields 104 contain valid entries before posting to the remote server. The interactive form 34-1 may then provide the communication bridge with a feedback message indicating whether the submission was successful, which may be reflected in a message displayed to the user in message zone 108D. In the embodiment and scenario illustrated in FIG. 2, for example, the user has selected the Submit button 120, and the interactive form 34-1 has determined that at least one of fields 104 contains an invalid entry (in this example, both "Street Address" and "City"). Thereafter, in this example, the interactive form 34-1 may send an indication of the invalid entries to the form interaction framework software 62 via the communication bridge, and the form interaction framework software 62 may display a message in message zone 108D indicating such to the user ("Form cannot be submitted until all required fields are filled with valid information").

When a user selects the Clear button 122, the communication bridge component of the form interaction framework software 62 may provide the interactive form 34-1 with an indication that the button 122 has been activated. In response to processing the indication, the interactive form 34-1 may cause the information entered in fields 104 to be reset to a default state (e.g., blank). In some embodiments, the interactive form 34-1 may provide the communication bridge with a feedback message indicating completion of the operation. The form interaction framework software 62 may then display a message indicating completion of the operation (e.g., "All fields cleared") in message zone 108D.

When a user selects the Cancel button 124, the communication bridge component of the form interaction framework software 62 may provide the interactive form 34-1 with an indication that the button 124 has been activated. In response to processing the indication, the interactive form 34-1 may cause an in-progress submission of the field entries to be terminated.

When a user selects the Find button 126, the communication bridge component of the form interaction framework software 62 may provide the interactive form 34-1 with an indication that the button 126 has been activated. In some embodiments, the form interaction framework software 62 may also provide the interactive form 34-1 with an indication of one or more search terms entered by the user (e.g., entered in a pop-up window provided by the form interaction framework software 62 after the button 126 was activated). In response to processing the indication and search terms, the interactive form 34-1 may search the text (e.g., field labels) for the indicated term(s). The interactive form 34-1 may indicate matching terms by adding color highlighting to the terms, underlining the terms, etc. In some embodiments, the interactive form 34-1 may provide the communication bridge with a feedback message indicating completion of the operation and/or results of the operation. The form interaction framework software 62 may then display a message indicating completion of the operation (e.g., "No search results found," "See search results below," etc.) in message zone 108D.

When a user selects the Sign button 130, the communication bridge component of the form interaction framework software 62 may provide the interactive form 34-1 with an indication that the button 130 has been activated. In response to processing the indication, the interactive form 34-1 may perform a lookup to retrieve a secure certification/signature associated with the user, and associate the certification/signature with the information currently entered in the fields 104. In some embodiments, the interactive form 34-1 may also add text or graphics representing the signature to the displayed form 34-1. In some embodiments, the interactive form 34-1 may further provide the communication bridge with a feedback message indicating completion of the operation. The form interaction framework software 62 may then display a message indicating completion of the operation (e.g., "Form signed") in message zone 108D.

When a user selects the Review button 132, the communication bridge component of the form interaction framework software 62 may provide the interactive form 34-1 with an indication that the button 132 has been activated. In response to processing the indication, the interactive form 34-1 may process the information within one, some or all of fields 104 to determine whether the information entered in the field(s), if any, constitutes a valid entry or entries. "Valid" entries are determined based on a set of entry rules applied by the interactive form 34-1. The entry rules may include field-specific rules and/or global rules that are applicable to all of (or a subset of) fields 104. For example, a first field-specific rule may be that a name field cannot contain numeric characters, a second field-specific rule may be that the name field must contain more than one character, etc. As another example, a first global rule may be that no field may be blank (i.e., at least one character must be entered), a second global rule may be that no special characters (e.g., asterisks, exclamation points, ampersands, etc.) may be entered in any field, etc. In some embodiments, the interactive form 34-1 provides the communication bridge with a feedback message indicating completion of the operation. The form interaction framework software 62 may then display a message indicating completion of the operation (e.g., "All form entries valid," "Form contains at least one invalid entry," etc.) in message zone 108D. In some embodiments, the interactive form 34-1 may also cause fields with invalid entries to be emphasized (e.g., highlighted, bolded, etc.), and/or provide messages next to fields with invalid entries (e.g., messages 144 in the example of FIG. 2). In embodiments where the interactive form 34-1 checks for valid entries at the time each field is populated (e.g., when a user tabs out of a field, etc.), however, messages similar to messages 144 may be displayed in the form container area 102 prior to a user activating button 132.

When a user selects the Save button 134, the communication bridge component of the form interaction framework software 62 may provide the interactive form 34-1 with an indication that the button 134 has been activated. In response to processing the indication, the interactive form 34-1 may post the information entered in fields 104 to a remote server (e.g., server device 18), and also send the remote server an indication that the entry information is not finalized (i.e., should be "saved" rather than "submitted"). In some embodiments, the interactive form 34-1 may provide the communication bridge with a feedback message indicating completion of the operation. The form interaction framework software 62 may then display a message indicating completion of the operation (e.g., "Form entries saved") in message zone 108D.

When a user selects the Help button 136, the communication bridge component of the form interaction framework software 62 may provide the interactive form 34-1 with an indication that the button 136 has been activated. In response to processing the indication, the interactive form 34-1 may cause information facilitating user entries into one or more of fields 104 to be displayed (e.g., in the form container area 102, or within a pop-up window). The help information may consist of a fixed set of text describing the types of information that a user should enter, or may be interactive (e.g., permitting the user to enter search terms to get help with a particular one of fields 104, etc.).

In some embodiments, a subset of the buttons in the action zone 108C may not result in communication with the interactive form 34-1. For example, the form interaction framework software 62 may respond to a user activation of the Cancel button 124 by simply causing the web browser application 60 to navigate away from the web page 36, without communicating the activation of the Cancel button 124 to the interactive form 34-1.

Moreover, it is noted that the specific information, links, appearances, etc., of the various zones 108A-108E in FIG. 2 may differ according to different embodiments. Moreover, in some embodiments, form interaction framework area 108 may include more, fewer and/or different zones than are shown in FIG. 2. For example, form interaction framework area 108 may omit header zone 108A, description zone 108B, message zone 108D, and/or footer zone 108E.

B. Exemplary Display with Second Interactive Form

The exemplary display 150 of FIG. 3 corresponds to a scenario in which a user (e.g., the same user that had previously viewed interactive form 34-1, or a different user at a different client device) has selected interactive form 34-2 rather than interactive form 34-1. In the display 150, all or a part of the interactive form 34-2 may be displayed in a form container area 152. As seen in FIG. 3, the interactive form 34-2 may include a number of fields 154 in which the user may enter information (e.g., by operating input device 50). In the exemplary embodiment of FIG. 3, a scroll bar may allow the user to view different portions of the interactive form 34-2. As with FIG. 2, in other embodiments, or in a scenario where the interactive form 34-2 is sufficiently short (or below a certain level of magnification, etc.), the entire interactive form 34-2 may be displayed in the form container area 152 at one time. While FIG. 3 shows that the fields 154 may include at least account number, customer feedback type, and comments, the interactive form 34-2 may of course include more, fewer, and/or different fields in other embodiments, and/or one or more of the fields 154 may have a different appearance and/or be positioned differently within the interactive form 34-2.

Outside of form container area 152, but also within the display 150, a form interaction framework area 158 may include a number of different zones 158A through 158E. In the embodiment of FIGS. 2 and 3, the same form interaction framework software 62 may be used to generate display 100 and display 150. Accordingly, the controls, labels, links, other information, etc. may have the same content and appearance (e.g., font type, font size, color, placement, etc.) in both display 100 and display 150, with the exception that the interactive form 34-2 (displayed in form container area 152 of display 150) is different than the interactive form 34-1 (displayed in form container area 102 of display 100). Thus, for example, header zone 158A may include a company name 160 and links 162 to business units that may be identical to company name 110 and links 112, respectively, of header zone 108A in display 100. In some embodiments, however, one or more of the zones 158 may include content that is form-dependent. In the embodiment of FIGS. 2 and 3, for example, the form description zone 108B (FIG. 2) or 158B (FIG. 3) may include the title and description of the particular form being accessed by the user. Thus, display 150 may include a form title 164 and form description 166 corresponding uniquely to interactive form 34-2, while display 100 may include a different form title 114 and form description 116 that correspond uniquely to interactive form 34-1. In some embodiments, the form interaction framework software 62 may obtain the form title and/or form description from the interactive form itself via the communication bridge. In other embodiments, the form interaction framework software 62 may obtain the form title and/or form description from data associated with the reference 26 (of web page(s) 24) via which the interactive form was accessed.

In the action zone 158C, the display 150 includes a header zone 158A that contains a Submit button 170, a Clear button 172, a Cancel button 174, a Find button 176, a Sign button 180, a Review button 182, a Save button 184, and a Help button 186. From the perspective of the form interaction framework software 62, each of these buttons may have the same functionality as the corresponding buttons in action zone 108C of display 100, as described above with reference to FIG. 2. In some embodiments, however, the exact implementation of the actions corresponding to each button may depend upon the interactive form being accessed. For example, the interactive form 34-1 may process an indication from the communication bridge that the Submit button 120 has been activated by determining whether all entries are valid and then, if valid, posting the entries to a remote server, while the interactive form 34-2 may process an indication from the communication bridge that the Submit button 170 has been activated by posting all entries to the remote server, without first determining whether all entries are valid. In other embodiments, interactive forms 34-1 and 34-2 may perform some or all form-level actions in the same manner. The implementation of each form-level action may depend upon the file format of the form, and/or the vendor tooling used to create the form, for example.

Moreover, in some embodiments, the set of action buttons (or other interactive controls) available in the action zone may be form-dependent. For example, the communication bridge of the form interaction framework software 62 may send the interactive form a query as to what functions are supported, receive a response from the interactive form indicating the supported functions, and then display in the action zone only those buttons that correspond to supported functions. If interactive form 34-2 does not support help functions, for example, the form interaction framework software 62 may omit the help button 186 in display 150, while still displaying all other buttons in the action zone 158C in the same locations shown in FIG. 3.

The message zone 158D may provide feedback to the user in response to processing/tasks that have been performed using the interactive form 34-2 (e.g., as described above in connection with message zone 108D of FIG. 2). In the exemplary embodiment of FIGS. 2 and 3, the footer zone 158E may include links 190 and copyright information 192 identical to links 140 and/or copyright information 142 of footer zone 108E.

In operation, a user may enter information into one, some or all of fields 154 (e.g., using input device 50 of FIG. 1), and the interactive form 34-2 may perform some processing in response to individual user entries within the fields 154, in a manner similar to that described above in connection with FIG. 2. In some embodiments and/or scenarios, however, the interactive form 34-2 processes at least some entry-level actions (e.g., lookups, determining whether an entry is valid after a user tabs out of the field, etc.) differently than the interactive form 34-1. The implementation of entry-level actions may depend upon the file format of the form, and/or the vendor tooling used to create the form, for example. In the exemplary embodiment of FIG. 3, the interactive form 34-2 may provide a message 194 ("Please select value") next to a drop-down menu (one of fields 154), and may change the message 194 (e.g., simply remove the message) once a value has been selected. As with the interactive form 34-1, in some embodiments, the processing performed by the interactive form 34-2 may be independent of the form interaction framework software 62.

IV. Exemplary Process Flow for Providing an Interactive Form

Figure 4:
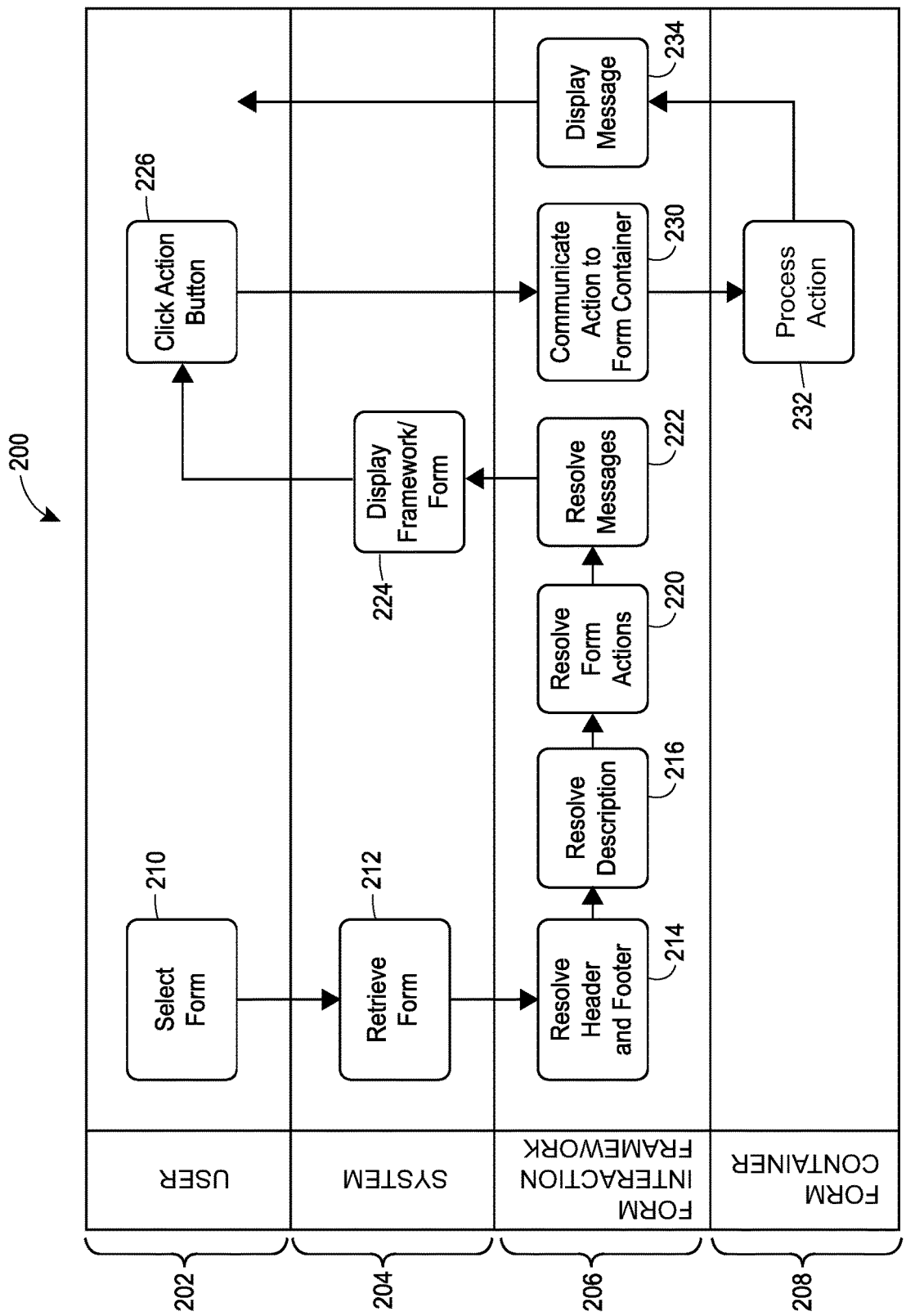
FIG. 4 depicts an exemplary process flow that occurs when a user selects an interactive form, according to an embodiment.

FIG. 4 depicts an exemplary process flow 200 that may occur when a user selects an interactive form, according to an embodiment. The first row of the process flow 200 corresponds to actions performed by a user 202, the second row corresponds to actions performed by a system 204, and the third row corresponds to actions performed by form interaction framework software 206. The fourth row corresponds to actions performed by a form container software component 208 based upon instructions of the interactive form being accessed. The user 202 may be a user operating a client device similar to client device 12 of FIG. 1, the form interaction framework software 206 may be similar to form interaction framework software 62 of FIG. 1, and the form container software component 208 may be similar to the form container software component 66 of FIG. 1, for example. The system 204 generally refers to devices/components/software other than the form interaction framework software 206 and the form container software component 208 (e.g., the server device 16 and/or 18 and programs executed thereon, the web browser application 60 of client device 12, etc.).

Initially, in this exemplary embodiment, the user 202 may select a form (block 210). In response, the system 204 (e.g., server device 16 and/or server device 18) may retrieve the selected form from a forms database (block 212). The system 204 may then call the form interaction framework software 206, which resolves header and footer information (block 214), resolves description information associated with the selected form (block 216), resolves form action controls (block 220), and resolves any messages (block 222). The header and footer information may be similar to the information in zones 108A and 108E, respectively, of FIG. 2, the description information may be similar to the information in zone 108B of FIG. 2, the form action controls may be similar to the controls in zone 108C of FIG. 2, and/or the messages may be similar to messages in zone 108D of FIG. 2, for example. In other embodiments, form interaction framework software 206 may perform blocks 214-222 in a different order, and/or simultaneously. Once the form interaction framework software 206 resolves the various types of information, controls, etc. at blocks 214-222, the system 204 (e.g., web browser application 60) may display to the user 202 the resolved portions in a form interaction framework area (e.g., form interaction framework area 108 of FIG. 2). While not shown in FIG. 4, the form container software component 208 may resolve the various elements of the form itself, and cause the system 204 to display the form in a form container area (e.g., form container area 102 of FIG. 2).

The user 202 may then use an input device such as input device 50 to click on an action button (or otherwise activate an interactive control) in the form interaction framework area (block 226). In response, the form interaction framework software 206 may communicate that action to the form container software component 208 (block 230). The form interaction framework software 206 may communicate the selected action (e.g., submit, clear, etc.) by generating a message compatible with the form container software component 208, and/or compatible with the file format of the interactive form selected at block 210. For example, the form interaction framework software 206 may generate the message such that it conforms to an application programming interface (API) of the form container software component 208.

Upon receiving notice of the selected action, the form container software component 208 processes/performs the action in accordance with instructions of the interactive form (block 232). In some embodiments and scenarios, form container software component 208 may also generate a feedback message based on the processing at block 232 (e.g., a message conforming to an API of the form container software component 208), and provide the feedback message to the form interaction framework software 206. The form interaction framework software 206 may then display to the user 202 a message reflecting the feedback message from the form container software component 208 in the form interaction framework area (e.g., a message indicating successful execution of the action, or indicating a reason for unsuccessful execution, etc.).

V. Exemplary User Interaction with an Interactive Form

Figure 5:
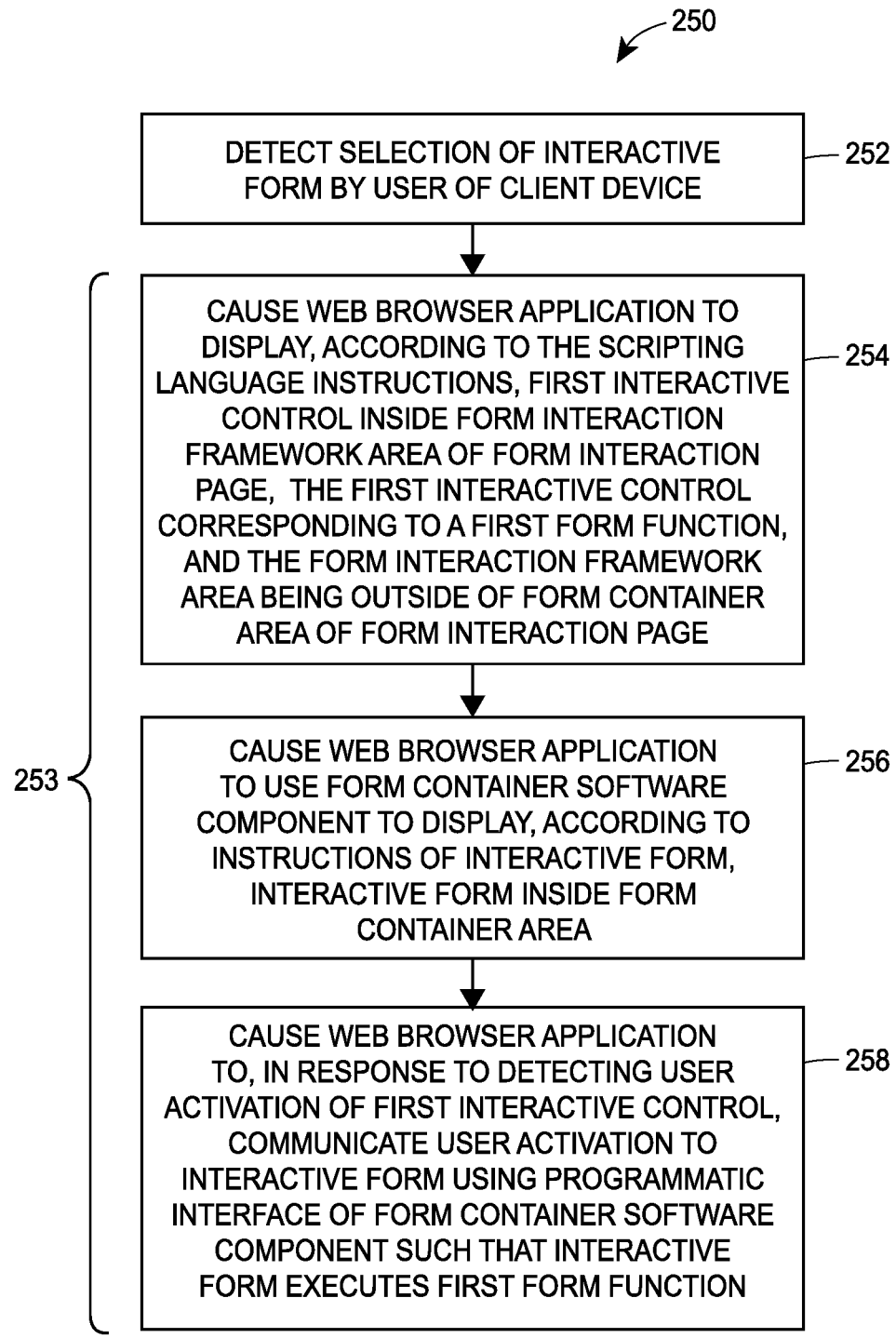
FIG. 5 depicts a flow diagram of an exemplary method for facilitating user interaction with an interactive form, according to an embodiment.

FIG. 5 depicts a flow diagram of an exemplary method 250 for facilitating user interaction at a client device with an interactive form having one or more fillable fields, according to an embodiment. In one embodiment, the method 250 may be implemented in (e.g., performed by a processor within) a server device, such as server device 18 of FIG. 1, for example.

In the method 250, a selection of the interactive form by the user of the client device may be detected (block 252). The interactive form may conform to any suitable file format, such as PDF, HTML or XML-based file formats, for example. In response to detecting the selection of the interactive form, scripting language instructions (e.g., JSP instructions) may be automatically provided to the client device (blocks 253). The scripting language instructions may be included in a web page stored on a non-transitory, computer-readable medium at the server device, for example, and the server device processor may provide the scripting language instructions at least in part by allowing the client device to access those instructions in response to the user's selection of the interactive form. The scripting language instructions, when interpreted by a web browser application executing on the client device (e.g., web browser application 60), may cause the web browser application to present various types of content and perform various operations (automatically, and/or in response to user inputs). For example, providing the scripting language instructions to the client device may cause the web browser application to display, via a user interface of the client device, a first interactive control inside a form interaction framework area of a form interaction page (block 254). The first interactive control may be displayed according to the scripting language instructions (e.g., with content and presentation of the interactive control being defined by the scripting language instructions). The form interaction framework area may be outside of a form container area of the form interaction page. In an embodiment, the entire form interaction framework area may be displayed according to the scripting language instructions (e.g., with content and presentation of the entire form interaction framework area being defined by the scripting language instructions). The form interaction page, when displayed, may appear similar to display 100 or display 150, for example.

The first interactive control (e.g., button) may correspond to a first form function. The first form function may include submitting information entered in the one or more fillable fields to a server device remote from the client device (e.g., the server implementing the method 250), and, in some embodiments, determining whether information entered in each of at least one of the one or more fillable fields constitutes a valid entry prior to submitting the entered information. In other embodiments, the first form function may include determining whether entries are valid, but without attempting to submit the form entry information. In still other embodiments, the first form function may include associating an electronic signature with information entered by the user in at least one of the one or more fillable fields, setting at least one of the one or more fillable fields to a default state (e.g., blank), or any other suitable form-level function or group of functions. The form interaction framework area may also include one or more additional interactive controls corresponding to one or more additional form functions.

Providing the scripting language instructions to the client device may also cause the web browser application to use a form container software component that extends the functionality of the web browser application to display the interactive form inside the form container area of the form interaction page (block 256). The form container software component may display the interactive form according to instructions included in the interactive form (e.g., with content and presentation of the form being defined by HTML instructions, PDF instructions, XML-based instructions, or other instructions that may be included in the interactive form). The form container software component may be a plugin or an extension, for example. In various embodiments, the form container software component may be associated with a particular third-party vendor. For example, the form container software component may be Adobe software, Thunderhead, HP software, IBM software, etc.

Providing the scripting language instructions to the client device may also cause the web browser application to, in response to detecting a user activation of the first interactive control, communicate the user activation of the first interactive control to the interactive form such that the interactive form executes the first form function (block 258). It is understood that references herein to an interactive form "executing" or "performing" a function/processing can encompass the form container software component executing the function/processing according to instructions included in the interactive form. The web browser application may communicate the user activation using a programmatic interface (e.g., API) of the form container software component.

In some embodiments, the method 250 may include one or more additional blocks not shown in FIG. 5. In one embodiment, for example, blocks 253 may include an additional block in which the web browser application is caused to, based upon information received from the interactive form in response to communicating the user activation at block 256, display, via the user interface of the client device, a message in the form interaction framework area. The message may be displayed according to the scripting language instructions provided to the client device (e.g., with content and presentation of the message being defined by the scripting language instructions).

As another example, in an embodiment where the form interaction framework area also includes at least a second interactive control corresponding to a second form function different than the first form function, blocks 253 may include an additional block (e.g., after block 258) in which the web browser application is caused to, in response to detecting a user activation of the second interactive control, communicate the user activation of the second interactive control to the interactive form such that the interactive form executes the second form function. The user activation of the second interactive control may be communicated using the same programmatic interface that was used to communicate the user activation of the first interactive control.

As yet another example, blocks 253 may include an additional block (before, after and/or contemporaneously with block 254) in which the web browser application is caused to display, in the form interaction framework area and according to the scripting language instructions, information describing the interactive form. The description may be a form title or label, an intended use for the form, and/or any other suitable type of form metadata. Alternatively or additionally, blocks 253 may include an additional block (before, after and/or contemporaneously with block 254) in which the web browser application is caused to display, in the form interaction framework area and according to the scripting language instructions (e.g., with content and presentation being defined by the scripting language instructions), information identifying an entity providing the interactive form (e.g., a company name) and/or links to one or more web pages associated with the entity providing the interactive form. In still other embodiments, blocks 253 may include one or more an additional blocks in which the web browser application is caused to display other suitable information, graphics, images, web page links, etc. in the form interaction framework area and according to the scripting language instructions (e.g., with content and presentation being defined by the scripting language instructions).

The scripting language instructions (e.g., JSP instructions) provided at blocks 253 may be a single set of instructions that the server device provides to the client device regardless of which interactive form is selected. For example, the set of instructions may include, in addition to the instructions that define the content and presentation of the form interaction framework area, multiple subsets/modules of instructions each configured to enable communication with a different type of interactive form (e.g., with a different type of file format and/or form container). The user's web browser application may then identify the form container software component being used to display the form, and/or the file format of the interactive form, and select the appropriate subset/module in order to communicate with that form container software component (e.g., in accordance with an API of the form container software component, etc.). In other embodiments, different sets of scripting language instructions may be compatible with different form container software components, and only the appropriate set of instructions (i.e., the set of instructions capable of communicating with the applicable form container software component) may be provided to the user's client device when a particular interactive form has been selected.

VI. Exemplary System for Providing an Interactive Form

Figure 6:
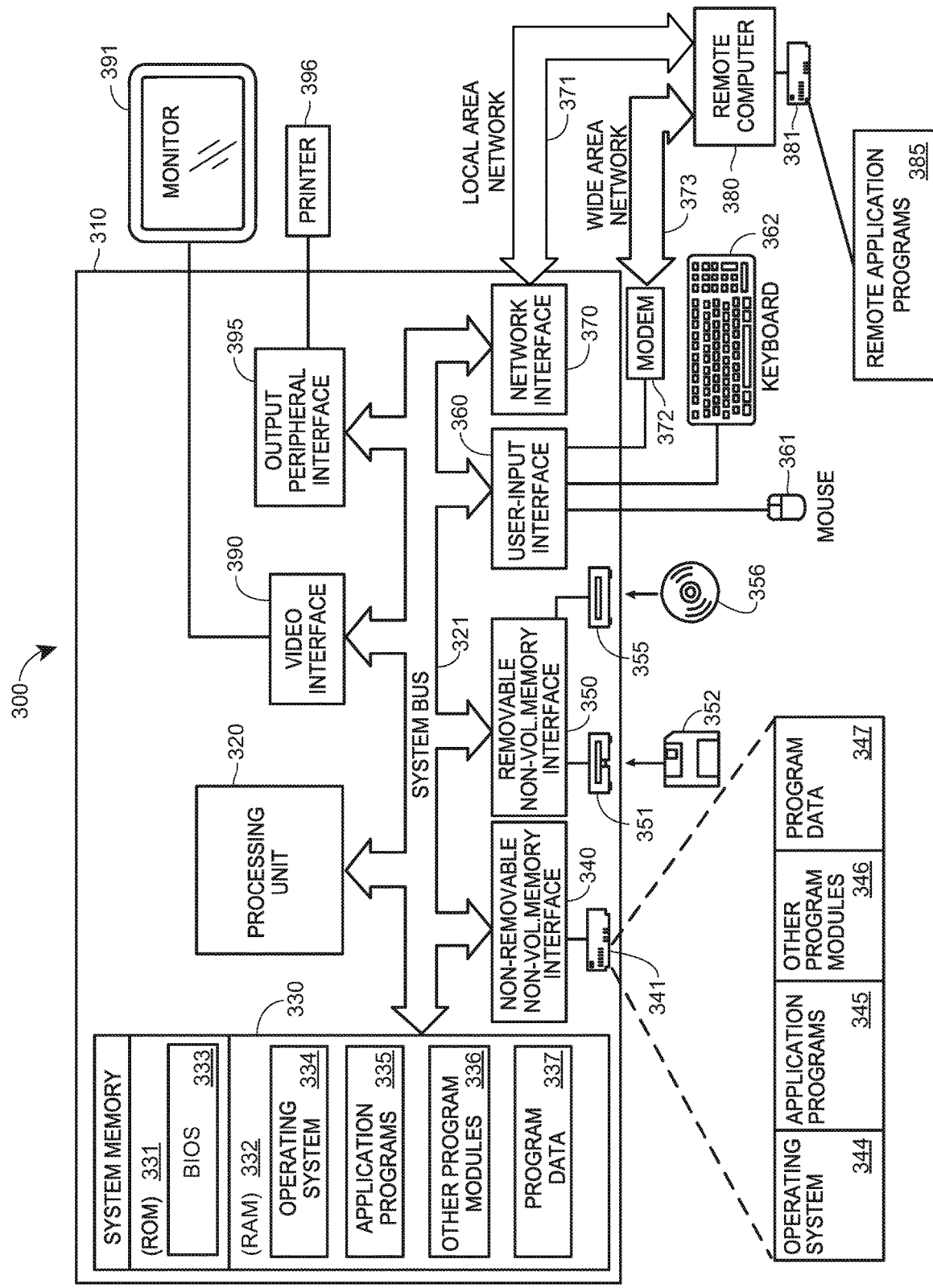
FIG. 6 depicts an exemplary computer system in which the techniques for facilitating user interaction with an interactive form described herein may be implemented, according to an embodiment.

FIG. 6 depicts an exemplary computer system 300 in which the techniques for facilitating user interaction with an interactive form described herein may be implemented, according to an embodiment. The computer system 300 of FIG. 6 may include a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 typically includes a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which may be used to store the desired information and which can accessed by computer 310. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 6 illustrates operating system 334, application programs 335, other program modules 336, and program data 337.

The computer 310 may also include other removable/non-removable, volatile/nonvolatile computer storage media. By way of example only, FIG. 6 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 6 provide storage of computer-readable instructions, data structures, program modules and other data for the computer 310. In FIG. 6, for example, hard disk drive 341 is illustrated as storing operating system 344, application programs 345, other program modules 346, and program data 347. Note that these components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, touch screen, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 6. The logical connections depicted in FIG. 6 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 6 illustrates remote application programs 385 as residing on memory device 381.

The methods for providing interactive forms described above may be implemented in part or in their entirety using one or more computer systems such as the computer system 300 illustrated in FIG. 6. The computer 310 may be a client device of a user/customer, for example, and the remote computer 380 may be a server device providing the interactive form, for example. In some such embodiments, the LAN 371 may be omitted (e.g., communications may between computers 310, 380 may only occur via WAN 373). Application programs 335 and 336 may include a web browser application and one or more form container software components, for example. Remote computer 380 may receive data indicating that a particular interactive form has been selected either directly from computer 310, or from a different server device hosting a web page with a link/reference to the interactive form, for example.

As another example, computer (e.g., server) 380 may retrieve the form interaction framework software (e.g., scripting language instructions) from memory storage device 381 and provide those instructions to computer 310 (in addition to the interactive form itself) in response to the selection of the interactive form. Additionally, or alternatively, the user may enter form field information using keyboard 362 and/or cursor control device 361, and data indicating the entries may be transmitted to remote computer 380 (e.g., via modem 372 and WAN 373) when the user activates a "submit" button (e.g., using cursor control device 361). Some or all operations performed by the web browser application in the embodiments described above may be performed by a processor such as the processing unit 320 when executing the web browser application. The displays described in the above embodiments, such as display 100 of FIG. 2 and/or display 150 of FIG. 3, for example, may be displayed on monitor 391.

VII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing interactive forms through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method, implemented in an electronic forms processing system, for facilitating user interaction at a client device with an interactive form having one or more fillable fields, the method comprising:

detecting, by a processor of the electronic forms processing system, a selection of the interactive form by a user of the client device; and after detecting the selection of the interactive form, automatically providing, by a processor of the electronic forms processing system, form interaction framework software to the client device, wherein the form interaction framework software includes instructions that cause a web browser application of the client device to display, via a user interface of the client device, a submit control inside a form interaction framework area of a form interaction page, the submit control corresponding to a form submission function, and the form interaction framework area being outside of a form container area of the form interaction page;

use a viewer software component that extends functionality of the web browser application to display, according to instructions of the interactive form, the interactive form inside the form container area while the submit control is displayed inside the form interaction framework area; and in response to detecting a user activation of the submit control inside the form interaction framework area, communicate the user activation of the submit control to the interactive form using a programmatic interface of the viewer software component such that the interactive form executes the form submission function, wherein the form submission function includes submitting information entered by the user in the one or more fillable fields to a server device remote from the client device.

2. The method of claim 1, wherein automatically providing the form interaction framework software to the client device further includes causing the web browser application to display, via the user interface of the client device, a message in the form interaction framework area, the message being based upon information received from the interactive form in response to communicating the user activation of the submit control to the interactive form.

3. The method of claim 1, wherein automatically providing form interaction framework software to the client device includes providing scripting language instructions to the client device.

4. The method of claim 3, wherein automatically providing scripting language instructions to the client device includes providing JavaServer Pages (JSP) instructions to the client device.

5. The method of claim 1, wherein the interactive form is an interactive PDF form.

6. The method of claim 1, wherein the client device uses the viewer software component by executing compiled instructions of the viewer software component.

7. The method of claim 1, wherein the form submission function further includes:
prior to submitting the information entered by the user in the one or more fillable fields, determining whether information entered by the user in each of at least one of the one or more fillable fields constitutes a valid entry.

8. The method of claim 1, wherein detecting the selection of the interactive form includes detecting a selection made by the user via a web page accessed by the web browser application.

9. The method of claim 1, wherein automatically providing the form interaction framework software to the client device:
includes causing the web browser application to display, according to the instructions and inside the form interaction framework area,
the submit control, and
a second control corresponding to a form function different than the form submission function; and
further includes causing the web browser application to, in response to detecting a user activation of the second control, communicate the user activation of the second control to the interactive form using the programmatic interface of the viewer software component such that the interactive form executes the form function different than the form submission function.

10. The method of claim 9, wherein:
the form function different than the form submission function includes (i) associating an electronic signature with information entered by the user in at least one of the one or more fillable fields, (ii) setting at least one of the one or more fillable fields to a default state, or (iii) determining whether information entered by the user in each of at least one of the one or more fillable fields constitutes a valid entry.

11. The method of claim 1, wherein automatically providing the form interaction framework software to the client device further includes:

causing the web browser application to display, in the form interaction framework area and according to the instructions, information describing the interactive form.

12. The method of claim 1, wherein automatically providing the form interaction framework software to the client device further includes:
causing the web browser application to display, in the form interaction framework area and according to the instructions, one or both of (i) information identifying an entity providing the interactive form, or (ii) links to one or more web pages associated with the entity providing the interactive form.

13. A non-transitory computer-readable medium storing form interaction framework software including instructions for facilitating user interaction at a client device with an interactive form having one or more fillable fields, wherein the instructions cause a web browser application of the client device to:
display, via a user interface of the client device, a submit control inside a form interaction framework area of a form interaction page, the submit control corresponding to a form submission function, and the form interaction framework area being outside of a form container area of the form interaction page;
use a viewer software component that extends functionality of the web browser application to display, according to instructions of the interactive form, the interactive form inside the form container area while the submit control is displayed inside the form interaction framework area; and
in response to detecting a user activation of the submit control inside the form interaction framework area, communicate the user activation of the submit control to the interactive form using a programmatic interface of the viewer software component such that the interactive form executes the form submission function,
wherein the form submission function includes submitting information entered, by a user of the client device, in the one or more fillable fields to a server device remote from the client device.

14. The non-transitory computer-readable medium of claim 13, wherein the instructions further cause the web browser application to:
display, via the user interface of the client device, a message in the form interaction framework area, the message being displayed based on information received from the interactive form in response to communicating the user activation of the submit control to the interactive form.

15. The non-transitory computer-readable medium of claim 13, wherein the form submission function includes submitting information entered by the user in the one or more fillable fields to a server device remote from the client device.

16. The non-transitory computer-readable medium of claim 15, wherein the form submission function further includes, prior to submitting the information entered by the user in the one or more fillable fields, determining whether information entered by the user in each of at least one of the one or more fillable fields constitutes a valid entry.

17. The non-transitory computer-readable medium of claim 13, wherein the instructions:
cause the web browser application to display, inside the form interaction framework area, the submit control, and a second control corresponding to a form function different than the form submission function; and further cause the web browser application to, in response to detecting a user activation of the second control, communicate the user activation of the second control to the interactive form using the programmatic interface of the viewer software component such that the interactive form executes the form function different than the form submission function.

18. The non-transitory computer-readable medium of claim 13, wherein the instructions are scripting language instructions interpreted by the web browser application.

19. The non-transitory computer-readable medium of claim 13, wherein the interactive form is an interactive Portable Document Format (PDF) form.

20. The non-transitory computer-readable medium of claim 13, wherein the instructions further cause the web browser application to:

display, in the form interaction framework area, one or both of (i) information identifying an entity providing the interactive form, or (ii) links to one or more web pages associated with the entity providing the interactive form.

\* \* \* \* \*